(12) United States Patent
Muller-Odenwald et al.

(10) Patent No.: US 9,845,953 B2
(45) Date of Patent: Dec. 19, 2017

(54) LEAKAGE REDUCTION SYSTEM IN POWER PLANT OPERATIONS

(71) Applicant: ARVOS TECHNOLOGY LTD., Brugg (CH)

(72) Inventors: Hermann Muller-Odenwald, Mannheim (DE); Friedrich Weyland, Wiesloch (DE)

(73) Assignee: ARVOS LJUNGSTROM LLC, Wellsville, NY (US)

( * ) Notice: Subject to any disclaimer, the term of this patent is extended or adjusted under 35 U.S.C. 154(b) by 626 days.

(21) Appl. No.: 14/102,735

(22) Filed: Dec. 11, 2013

(65) Prior Publication Data
US 2014/0170572 A1   Jun. 19, 2014

(30) Foreign Application Priority Data
Dec. 14, 2012 (EP) .................................... 12197258

(51) Int. Cl.
| | |
|---|---|
| F23D 11/44 | (2006.01) |
| F23L 15/02 | (2006.01) |
| F28D 19/04 | (2006.01) |
| F23C 9/00 | (2006.01) |

(52) U.S. Cl.
CPC ............... *F23L 15/02* (2013.01); *F23C 9/00* (2013.01); *F28D 19/041* (2013.01); *F28D 19/047* (2013.01); *Y02E 20/12* (2013.01); *Y02E 20/344* (2013.01)

(58) Field of Classification Search
CPC ...... F28D 19/04; F28D 17/026; F28D 19/042; F28D 19/048; F23L 15/02; F23C 9/00; F23C 7/105; F24F 2203/1032; F24F 2203/104

USPC ........... 431/11; 110/302; 165/7, 8, 9, 88; 318/432

See application file for complete search history.

(56) References Cited

U.S. PATENT DOCUMENTS

| | | | |
|---|---|---|---|
| 1,970,127 A * | 8/1934 | Colby | ................... F28D 19/041 110/165 A |
| 2,347,857 A * | 5/1944 | Waitkus | .................. F28D 19/04 165/7 |
| 2,899,179 A | 8/1959 | Häussler | |
| 3,321,011 A | 5/1967 | Kalbfleisch et al. | |

(Continued)

FOREIGN PATENT DOCUMENTS

| | | |
|---|---|---|
| DE | 1113 534 | 9/1961 |
| JP | 55-5008 B2 | 2/1980 |

(Continued)

*Primary Examiner* — Vivek Shirsat
(74) *Attorney, Agent, or Firm* — Murtha Cullina LLP

(57) ABSTRACT

The leakage reduction system includes a heat exchanger, a duct arrangement and a separation arrangement. The heat exchanger includes a rotor assembly rotatably mounted along a rotor post. The heat exchanger further includes a second inlet plenum, whereat the duct arrangement is configured. Further, the separation arrangement is incorporated at the duct arrangement dividing thereto into primary and secondary inlets. Through the primary inlet, a flue gas enriched with Oxygen is carried, and through the secondary inlet a recycled flue gas flow is allowed to be carried, keeping the Oxygen enriched recycled flue gas flow substantially away from turnover towards the flue gas flow to avoid turnover towards a flue gas flow, reducing leakage thereof.

6 Claims, 3 Drawing Sheets

(56) References Cited

U.S. PATENT DOCUMENTS

2010/0289223 A1* 11/2010 Birmingham ......... F28D 19/041
  277/306
2011/0250551 A1* 10/2011 McDonald ............. F23L 15/02
  431/11

FOREIGN PATENT DOCUMENTS

JP          3-11362 B2    2/1991
WO      2012/035777 A1    3/2012

* cited by examiner

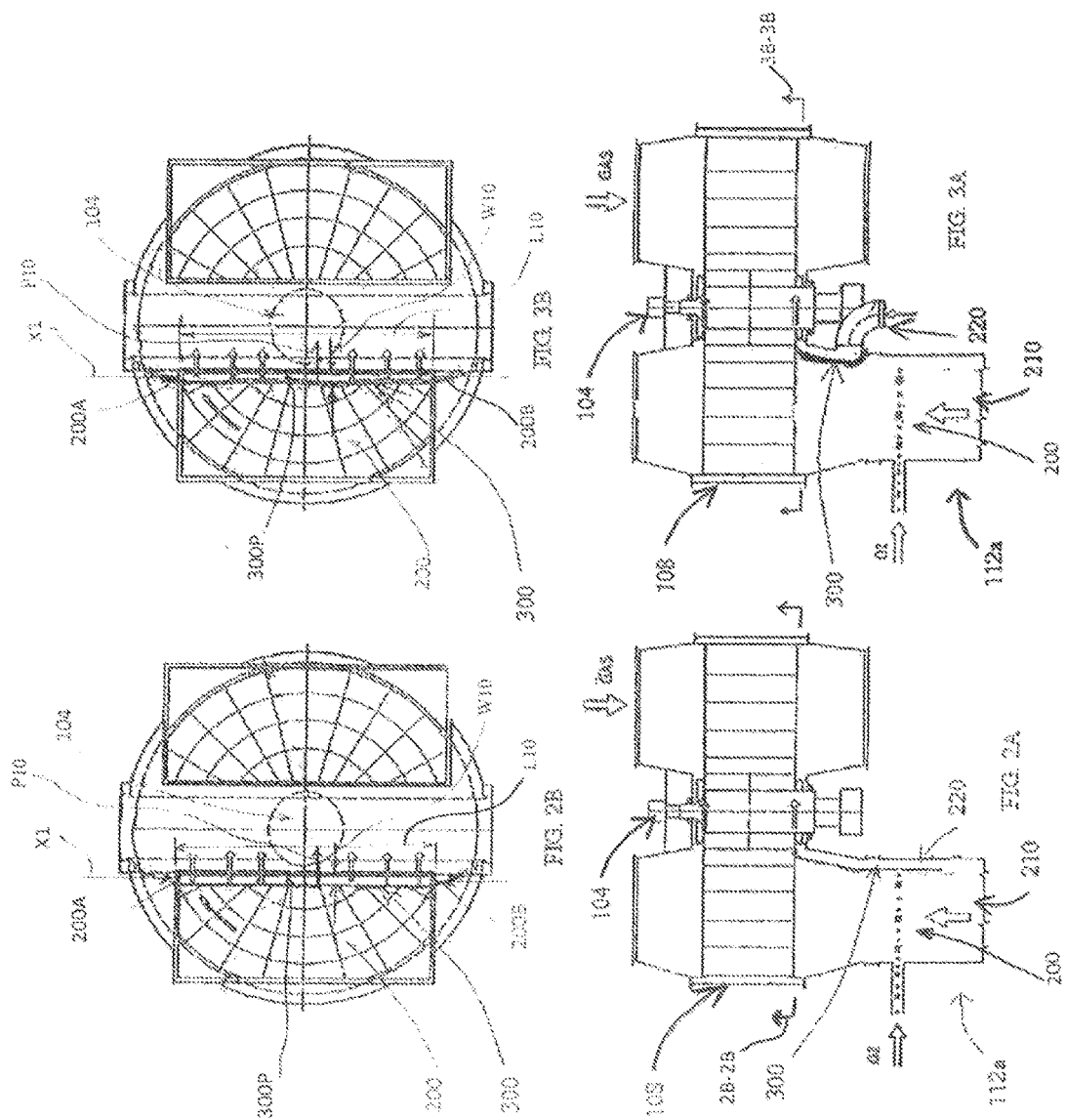

LEAKAGE REDUCTION SYSTEM IN POWER PLANT OPERATIONS

CROSS-REFERENCE TO RELATED APPLICATIONS

This application claims priority to European application 12197258.2 filed Dec. 14, 2012, the contents of which are hereby incorporated in its entirety.

TECHNICAL FIELD

The present disclosure relates to power plant operations and more particularly to a gas leakage reduction system across regenerative heat exchangers of such power plants.

BACKGROUND

In power plant operations, regenerative heat exchangers such as air preheaters are used to recover sensible heat contained in a flue gas flow leaving the boiler to transfer it to combustion air, entering therein. In addition to preheating the combustion air, the recovered heat may be utilized for heating an air stream that may be utilized for drying coal for being pulverized and burning in a furnace.

Depending upon the fuel characteristics and overall system design, the air streams characteristics and qualities are developed. For example, in the power plants, such as in Oxygen-fired power plants for oxy-fired applications, generally a mixture of nearly pure Oxygen and recycled flue gas are used for combustion of fuel. In such applications, there are most likely chances of Oxygen getting passed towards a flue gas side due to static pressure differential between the recycled flue and flue gas streams. Such leakage is of a major concern because of high capital cost of an Air Separation Unit (ASU) incorporated in the Oxygen-fired power plants for separating Oxygen from air, and its high parasitic power consumption. To reduce such leakage, usages of pressurized sealing are quite in practice and may have generally been considered satisfactory for their intended purposes, but may be unsatisfactory to prevent residual amount of Oxygen turn over towards the flue gas side due to such leakage.

SUMMARY

The present disclosure describes a leakage reduction system that will be presented in the following simplified summary to provide a basic understanding of one or more aspects of the disclosure that are intended to overcome the discussed drawbacks, but to include all advantages thereof, along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its aspects and advantages in a simplified form as a prelude to the more detailed description that is presented hereinafter.

An object of the present disclosure is to substantially reduce or prevent Oxygen turn over towards the flue gas side in Oxygen-fired power plants. Various other objects and features of the present disclosure will be apparent from the following detailed description and claims.

The above noted and other objects may be achieved by a leakage reduction system for power plant operations and method thereof.

In one aspect of the present disclosure, the leakage reduction system comprising:
a regenerative heat exchanger having,
  a rotor assembly rotatably mounted along a rotor post, the rotor assembly having a heat transfer element, and
  a housing configured to receive the rotor assembly therein, the housing having first inlet and outlet plenums for carrying through a flue gas flow, and second inlet and outlet plenums;
a duct arrangement configured to the second inlet plenum; and
a separation arrangement arranged across the duct arrangement of the second inlet plenum for configuring,
  a primary inlet for carrying through a recycled flue gas enriched with Oxygen, and
  a secondary inlet adjacent to the primary inlet for carrying through a recycled flue gas unenriched with oxygen, keeping the recycled flue gas flow enriched with Oxygen substantially away from turnover towards the flue gas flow, thereby reducing the leakage thereof.

In one embodiment of the above aspect, the separation arrangement comprises a separation plate arranged along and across the duct arrangement.

In one embodiment of the above aspect, the recycled gas flow is isokinetically fed into the duct arrangement. In one embodiment of the above aspect, the first inlet and outlet plenums and the second inlet and outlet plenums are divided across a diameter of the rotor assembly.

In another aspect of the present disclosure, a method for reducing leakage in power plant operations is provided. The method comprising:
providing a regenerative heat exchanger, the regenerative heat exchanger having,
  a rotor assembly rotatably mounted along a rotor post, the rotor assembly having a heat transfer element, and
  a housing configured to receive the rotor assembly therein, the housing having first inlet and outlet plenums for carrying through the flue gas flow, and second inlet and outlet plenums; wherein the second inlet plenum comprises a duct arrangement having a separation arrangement arranged there across for configuring a primary and secondary inlets;
carrying a recycled flue gas flow enriched with Oxygen through the primary inlet; and
carrying a recycled flue gas flow unenriched with Oxygen through the secondary inlet, keeping the flue gas flow enriched with Oxygen substantially away from turnover towards the flue gas flow, reducing the leakage thereof.

In one embodiment of the above aspect, carrying the recycled flue gas flow comprises isokinetically feeding thereto into the duct arrangement.

Further, in one embodiment of both of the above aspect, leakage reduction system further comprising a purge system assembled in proximity to the rotor post for carrying the recycled flue gas.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will be better understood with reference to the following detailed description and claims taken in conjunction with the accompanying drawing, wherein like elements are identified with like symbols, and in which:

FIGS. 2A and 2B, respectively, illustrate side and bottom (i.e., taken across line 2B-2B of FIG. 2A) views of a leakage reduction system for power plant operations, in accordance with an exemplary embodiment of the present disclosure;

FIGS. 3A and 3B, respectively, illustrate side and bottom (i.e., taken across line 3B-3B of FIG. 3A) views of a leakage reduction system for power plant operations, in accordance with an exemplary embodiment of the present disclosure.

Like reference numerals refer to like parts throughout the description of several views of the drawings.

DETAILED DESCRIPTION

Figure 1:
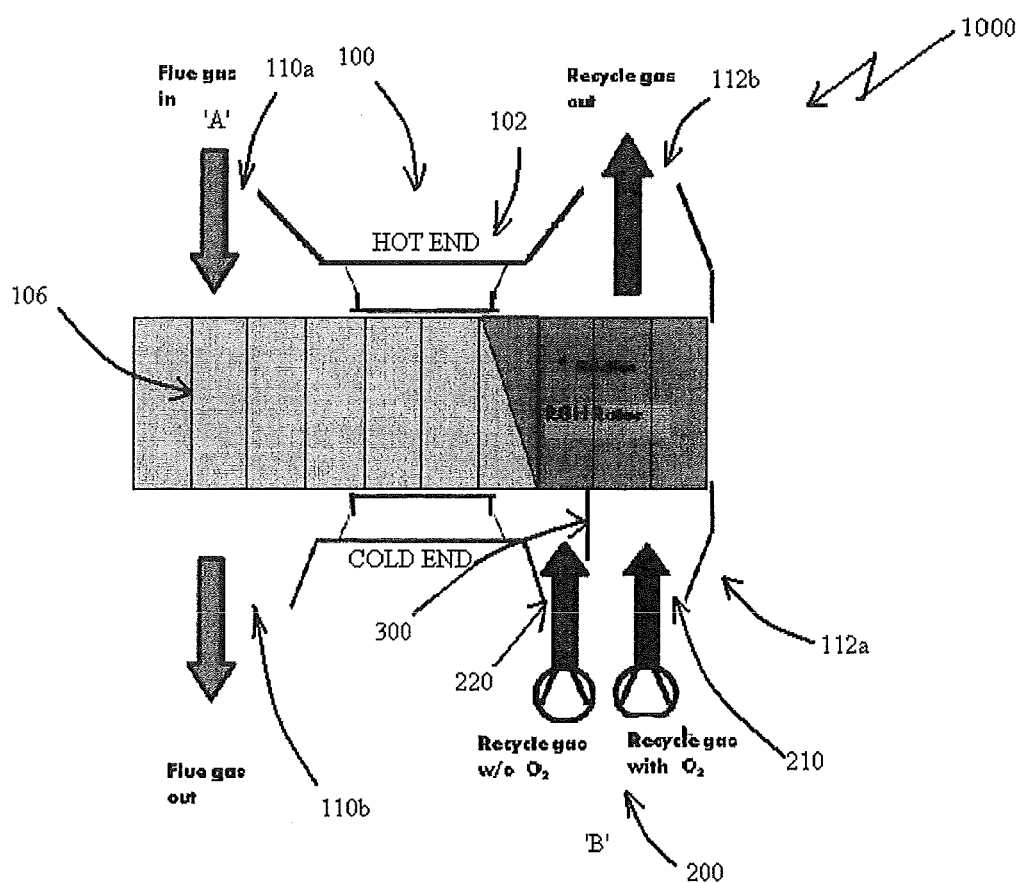
FIG. 1 illustrates a side view of a leakage reduction system for power plant operations, in accordance with an exemplary embodiment of the present disclosure.

For a thorough understanding of the present disclosure, reference is to be made to the following detailed description, including the appended claims, in connection with the above described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and devices are shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the relative terms, such as "primary," "secondary," "first," "second" and the like, herein do not denote any order, elevation or importance, but rather are used to distinguish one element from another. Further, the terms "a," and "an" herein do not denote a limitation of quantity, but rather denote the presence of at least one of the referenced item.

Disclosed herein is a leakage reduction system for a power plant. The power plant may be an Oxygen-fired power plant. While the present disclosure will be shown and described in conjunction with an Oxygen-fired power plant, the disclosure may contemplate such leakage reduction system for other applications. In as much as the construction and arrangement of the Oxygen-fired power plants are all well-known to those skilled in the art, it is not deemed necessary for purposes of acquiring an understanding of the present disclosure that there be recited herein all of the constructional details and explanation thereof. Rather, it is deemed sufficient to simply note that as shown in FIG. 1, a leakage reduction system 1000 that may be successfully utilized in relation to various power plants, as known there, in accordance with an exemplary embodiment of the present disclosure.

As will now be described in further detail with reference to the accompanying drawings, the leakage reduction system 1000, according to an exemplary embodiment provides benefits which include, but are not limited to, substantially reduced and/or effectively minimized Oxygen turn over towards a flue gas side in Oxygen-fired power plants. Herein also as shown in FIGS. 1 to 3B, the description of the leakage reduction system 1000 is made in relation to a bi-sector regenerative heat exchanger, such as the regenerative heat exchanger 100, however, without departing from the scope of the present disclosure, the leakage reduction system 1000 of the present invention may also be adapted to be configured in conjunction to tri-sector regenerative heat exchangers, quart-sector regenerative heat exchanger and the like, and shall not considered to be limiting only to the bi-sector regenerative heat exchanger, such as the regenerative heat exchanger 100 as shown therein.

Referring now to FIG. 1, a side view of the leakage reduction system 1000 for the Oxygen-fired power plant is illustrated, in accordance with an exemplary embodiment of the present disclosure. The leakage reduction system 1000 includes a regenerative heat exchanger 100, a duct arrangement 200 and a separation arrangement 300. The regenerative heat exchanger 100 is a rotary regenerative heat exchanger, such as a rotary regenerative air preheater. The regenerative heat exchanger 100 (hereinafter referred to as 'heat exchanger 100') includes a rotor assembly 102 rotatably mounted along a rotor post 104 (can be seen in FIGS. 2A and 3A). The rotor assembly 102 includes a heat transfer element 106 having various stacked heat transfer plates for transferring heat between a flue gas flow and a recycled flue gas flow. The heat exchanger 100 further includes a housing 108 (can be seen in FIGS. 2A and 3A) that is configured to receive the rotor assembly 102 therein.

The housing 108 includes first inlet and outlet plenums 110a, 110b for carrying through the flue gas flow (as indicated by an arrow 'A'). The housing 108 further includes second inlet and outlet plenums 112a, 112b for carrying through the recycled flue gas flow (as indicated by an arrow 'B'). In one embodiment, the first inlet and outlet plenums 110a, 110b and the second inlet and outlet plenums 112a, 112b are divided across a diameter of the rotor assembly 102 for respectively carrying the flue and recycled flue gas flows. The flue gas flow from a boiler enters the heat exchanger 100 from the first inlet plenum 110a and exits from the first outlet plenum 110b. Further, the recycled flue gas flow enters the heat exchanger 100 from the second inlet plenum 112a, and exits from the second outlet plenum 112b. The said gases pass through the heat transfer element 106 upon entering into the heat exchanger 100.

The heat transfer element 106 in the heat exchanger 100 transfers heat between the flue gas flow and the recycled flue gas flow. During such transfer, leakage of recycled gas flow towards the flue gas flow is one of a common concern due to the pressure differential between the flue and recycled flue gas flows. To prevent such leakage, in an example, in some heat exchanger radial and axial seal plates may be disposed between the housing 108 and the heat transfer element 106. Such seals minimize the leakage of the recycled flue gas flow into the flue gas stream. Such radial and axial seals may be pinned to the rotor and free to move to avoid thermal distortion. Such radial and axial seals may also be adjusted online by utilizing sensors in case of any misalignment or distortion to avoid leakage of between the flue and recycled flue gas flows. In another example, in some heat exchanger, diaphragm plates are provided to minimize leakage gas, instead of the radial and axial seals. The present disclosure intends to cover all such kind of air heat exchangers, without limiting its scope to any particular kind of heat exchanger, such as the heat exchanger 100.

Further, as stated above the leakage reduction system 1000 also includes the duct arrangement 200 configured to the second inlet plenum 112a. The recycled gas flow is isokinetically fed through the duct arrangement 200. Similar to the duct arrangement 200 at the second inlet plenum 112a, each inlet and outlet plenum, such as 110a, 110b; 112b may also configure a duct arrangement for directing and exiting respective gas flows in and from two respective plenums.

Furthermore, as stated above the leakage reduction system 1000 includes the separation arrangement 300, which is arranged across the duct arrangement 200 of the second inlet plenum 112a. In one embodiment, the separation arrangement 300 may be a separation plate, arranged along a portion of the duct arrangement 200 dividing thereto into primary and secondary inlets 210, 220 along the second inlet plenum 112a. The separation arrangement 300 extends continuously between opposing sides 200A and 200B of the duct arrangement 200. The separation arrangement 300 delimits first cross sectional flow area 300P in the duct arrangement. The cross sectional flow areas 300P extends a length L10 continuously between the opposing sides 200A and 200B of the duct arrangement 200 in the direction of the arrow X1. The first cross sectional flow area extends a non-zero width W10 across the entire length L10 of the flow area, the width W10 being measured in a direction P10 perpendicular to the length L10 of the flow area. The primary inlet 210 is spaced apart from the rotor post by separation arrangement 300 and the non-zero width W10 of the first cross sectional flow area traversely in the direction of the arrow X2 from the separation arrangement 300 towards the rotor post 104.

As stated, leakage around radial and axial regions of the heat exchanger 100 may be prevented by the radial and axial seals or diaphragm plates depending upon the kind of air-preheater, however, entrained leakage around the rotor post region 104 is unavoidable. Therefore in the Oxygen-fired power plants, where Oxygen separation for burning is quite an important process, any loss of Oxygen due to such entrained leakage may further add to its cost. Therefore, the separation arrangement 300 provides the two separate inlets, wherein the primary inlet 210 is configured for carrying through a recycled flue gas enriched with Oxygen. Further, the secondary inlet 220 is configured adjacent to the primary inlet 210 for carrying through the recycled flue gas flow unenriched with oxygen. Such an arrangement insures keeping the recycled flue gas enriched with Oxygen substantially away from turnover towards the flue gas flow, thereby reducing the leakage of the Oxygen enriched recycled flue gas, and preventing Oxygen turn over towards the flue gas flow.

Moreover, in one embodiment, the leakage reduction system 1000 further comprises a purge system (not shown) assembled in proximity to the rotor post 104 for carrying recycled flue gas.

Alternated arrangements of the heat exchanger 100 having the separation arrangements 300 may also be evident in FIGS. 2A and 2B, and in FIGS. 3A and 3B, and may be understood with reference to FIG. 1, as explained herein above. For the sake of brevity, the explanations thereof have been excluded herein.

Figure 4:
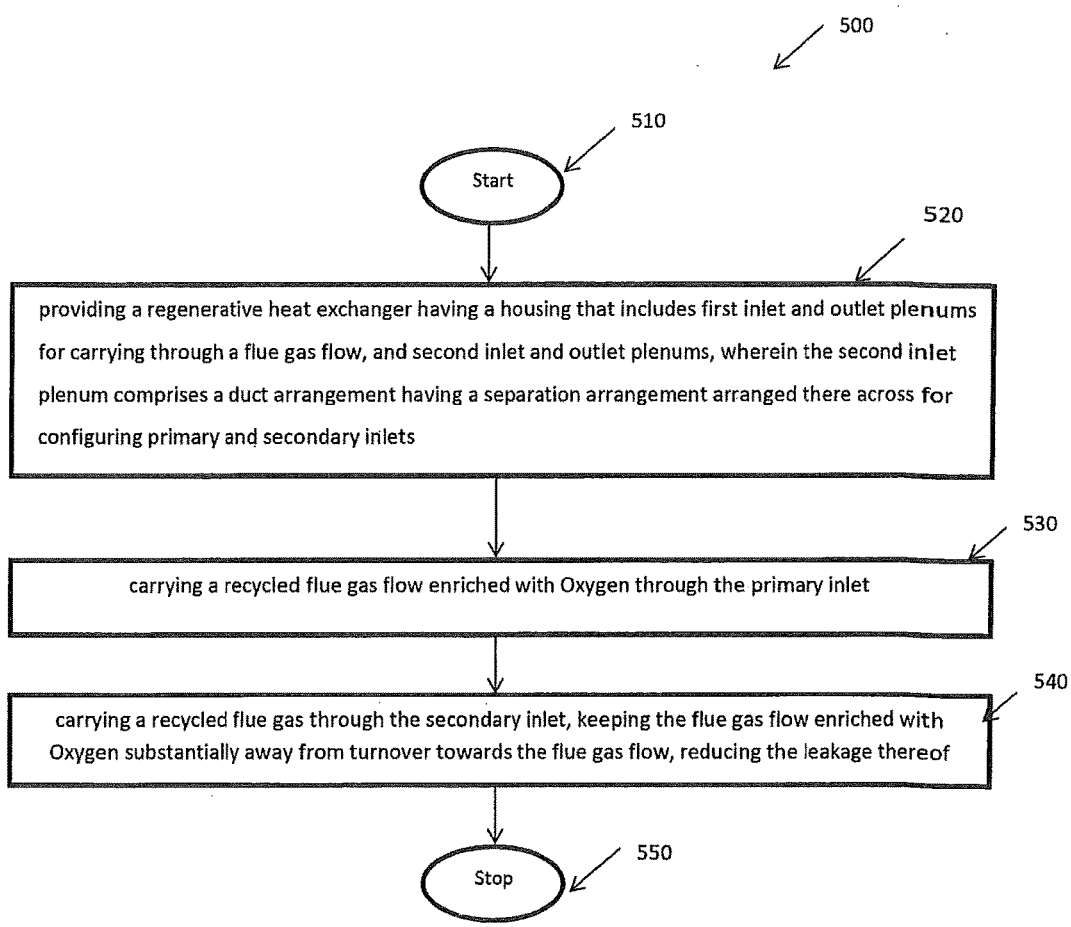
FIG. 4 illustrates a flow diagram of a method for reducing leakage in power plant operations, in accordance with an exemplary embodiment of the present disclosure.

Referring now to FIG. 4, a flow diagram of a method 500 for reducing leakage in a power plant operation is illustrated in accordance with an exemplary embodiment of the present disclosure. The method 500 includes limitation of the above described leakage reduction system 1000 of FIG. 1, and will be described herein in conjunction thereof. Repetition of the components explanation of the system 1000 is avoided herein for the sake of brevity.

The method 500 starts at 510. At 520, the heat exchanger 100 is provided. As described above, the duct arrangement 200 is configured to the heat exchanger 100 at the second inlet plenum 112a. Further as described, the separation arrangement 300 is incorporated at the duct arrangement 200 dividing the duct arrangement 200 into the primary and secondary inlets 210, 220 for carrying there-through the recycled flue gas and the recycled flue gas enriched with Oxygen. Specifically, at 530, the recycled flue gas enriched with Oxygen is carried through the primary inlet 210; and at 540, the recycled flue gas unenriched with Oxygen is carried through the secondary inlet 220, keeping the recycled flue gas enriched with Oxygen substantially away from turnover towards the flue gas flow, reducing turnover of Oxygen towards the flue gas flow. Method 500 stops at 550.

The leakage reduction system is advantageous in various scopes. The leakage reduction system substantially reduces and/or effectively minimizes Oxygen leakage in a regenerative heat exchanger. This feature is particularly beneficial in Oxygen-fired power plant for limiting the flow of Oxygen towards the flue gas coming from a furnace to substantially less than 1%. Further, the leakage reduction is a passive reduction system that drives the recycled flue gas flow enriched with Oxygen from the primary inlet, and drives the recycled flue gas flow unenriched with Oxygen from the secondary inlet without the requirement of FD fans. However, whenever required, such system is open to include additional pressure control fans of low power consumption for such gas flow regulation. The present disclosure is particularly beneficial of Oxygen-fired power plant in terms of blocking the supply of Oxygen to and around the area along the heat exchanger, such as the air preheater, where the leakage of Oxygen is unavoidable.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

The invention claimed is:

1. A leakage reduction system in power plant operations, the leakage reduction system comprising:
   a regenerative heat exchanger comprising,
      a rotor assembly rotatably mounted along a rotor post, the rotor assembly having a heat transfer element, and
      a housing configured to receive the rotor assembly therein, the housing having first inlet and outlet plenums for carrying through a flue gas flow, and second inlet and outlet plenums for carrying through a recycled flue gas flow;
   a duct arrangement configured to the second inlet plenum, the duct arrangement directing the recycled flue gas flow to the second inlet plenum; and
   a separation arrangement arranged within the duct arrangement of the second inlet plenum the separation arrangement defining a primary inlet within the second inlet plenum and a secondary inlet within the second inlet plenum and preventing flow between the primary inlet and the secondary inlet,
   the separation arrangement extending a length continuously between opposing sides of the duct arrangement, the separation arrangement delimiting a first cross sectional flow area in the duct arrangement, the first cross sectional flow area extending continuously between the opposing sides of the duct arrangement and the first cross sectional flow area extending a non-zero width across the entire length of the first cross sectional flow area, the width being measured in a direction perpendicular to the length of the first cross sectional flow area;
      the primary inlet for carrying through a recycled flue gas enriched with Oxygen, the primary inlet being spaced apart from the rotor post by the separation arrangement and the non-zero width of the first cross sectional flow area, and
      the secondary inlet adjacent to the primary inlet for carrying through a recycled flue gas, keeping the recycled flue gas flow enriched with Oxygen substantially away from turnover towards the flue gas flow, thereby reducing the leakage thereof.

2. The leakage reduction system as claimed in claim 1, wherein the separation arrangement comprises a separation plate arranged along and across the duct arrangement.

3. The leakage reduction system as claimed in claim 1, wherein the first inlet and outlet plenums and the second inlet and outlet plenums are divided across a diameter of the rotor assembly.

4. The leakage reduction system as claimed in claim 1, further comprising a purge system assembled in proximity to the rotor post for carrying the recycled flue gas for reducing leakage thereof.

5. A method for reducing leakage in power plant operations, the method comprising:
   providing a regenerative heat exchanger, the regenerative heat exchanger having,
      a rotor assembly rotatably mounted along a rotor post, the rotor assembly having a heat transfer element, and
      a housing configured to receive the rotor assembly therein, the housing having first inlet and outlet plenums for carrying through the flue gas flow, and second inlet and outlet plenums for carrying through a recycled flue gas flow; wherein the second inlet plenum comprises a duct arrangement configured thereto, said duct arrangement directing the recycled flue gas flow to the second inlet plenum, and having a separation arrangement arranged within the second inlet plenum and defining a primary inlet within the second inlet plenum and a secondary inlet within the second inlet plenum and preventing flow between the primary inlet and the secondary inlet; the separation arrangement extending continuously between opposing sides of the duct arrangement, the separation arrangement delimiting a first cross sectional flow area in the duct arrangement, the first cross sectional flow area extending a length continuously between the opposing sides of the duct arrangement and the first cross sectional flow area extending a non-zero width across the entire length of the first cross sectional flow area, the width being measured in a direction perpendicular to the length of the first cross sectional flow area;
   the primary inlet being spaced apart from the rotor post by the separation arrangement and the non-zero width of the first cross sectional flow area;
   carrying a recycled flue gas flow enriched with Oxygen through the primary inlet; and
   carrying a recycled flue gas through the secondary inlet, keeping the flue gas flow enriched with Oxygen substantially away from turnover towards the flue gas flow, reducing the leakage thereof.

6. The method for reducing leakage as claimed in claim 5, further comprising a purge system assembled in proximity to the rotor post for carrying the recycled gas flow for reducing leakage thereof.

* * * * *